US009930611B2

United States Patent
Qi et al.

(10) Patent No.: US 9,930,611 B2
(45) Date of Patent: Mar. 27, 2018

(54) NETWORK SELECTION METHOD AND CORE NETWORK DEVICE

(71) Applicant: Huawei Technologies Co., Ltd., Shenzhen (CN)

(72) Inventors: Caixia Qi, Shanghai (CN); Wei Liu, Shanghai (CN); Shuo Wang, Shanghai (CN); Yanping Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 15/142,167

(22) Filed: Apr. 29, 2016

(65) Prior Publication Data

US 2016/0249278 A1 Aug. 25, 2016

Related U.S. Application Data

(63) Continuation of application No. PCT/CN2013/086470, filed on Nov. 1, 2013.

(51) Int. Cl.
*H04W 4/00* (2009.01)
*H04W 24/00* (2009.01)
(Continued)

(52) U.S. Cl.
CPC ........... *H04W 48/14* (2013.01); *H04W 4/005* (2013.01); *H04W 8/06* (2013.01); *H04W 8/08* (2013.01); *H04W 48/18* (2013.01); *H04W 60/06* (2013.01)

(58) Field of Classification Search
None
See application file for complete search history.

(56) References Cited

U.S. PATENT DOCUMENTS

2006/0193289 A1* 8/2006 Ronneke ............... H04W 36/12
370/329
2008/0039087 A1* 2/2008 Gallagher ............... H04W 8/04
455/435.2

(Continued)

FOREIGN PATENT DOCUMENTS

| CN | 101500281 A | 8/2009 |
|---|---|---|
| CN | 101998517 A | 3/2011 |

(Continued)

OTHER PUBLICATIONS

Ericsson: "MME Selection Principles," 3GPP TSG SA WG2 Architecture-s2#57, S2-071739, Apr. 23-27, 2007, pp. 1-6, Beijing, China.

(Continued)

*Primary Examiner* — Erika Washington
(74) *Attorney, Agent, or Firm* — Slater Matsil, LLP

(57) ABSTRACT

Embodiments relate to a network selection method and an apparatus. The method comprises: after receiving an access request message from a UE, a first core network device may send, to the UE, information about a dedicated second core network device corresponding to the UE, thereby ensuring that the UE can be attached to the dedicated second core network device according to the information about the dedicated second core network device, increasing selection accuracy when a core network device is selected for the user terminal, and avoiding occurrence of an access failure of the user terminal to the greatest extent.

18 Claims, 4 Drawing Sheets

(51) Int. Cl.
*H04W 48/14* (2009.01)
*H04W 48/18* (2009.01)
*H04W 8/06* (2009.01)
*H04W 8/08* (2009.01)
*H04W 60/06* (2009.01)

(56) References Cited

U.S. PATENT DOCUMENTS

| | | |
|---|---|---|
| 2011/0096748 A1 | 4/2011 | Meyer et al. |
| 2011/0117946 A1* | 5/2011 | Vainola ............... H04W 28/08 455/509 |
| 2012/0287854 A1 | 11/2012 | Xie et al. |
| 2013/0095834 A1 | 4/2013 | Hou et al. |
| 2014/0211728 A1 | 7/2014 | Zembutsu et al. |
| 2015/0011250 A1 | 1/2015 | Xu |

FOREIGN PATENT DOCUMENTS

| | | |
|---|---|---|
| CN | 102026328 A | 4/2011 |
| CN | 102123477 A | 7/2011 |
| EP | 2523505 A1 | 11/2012 |
| RU | 2468542 C2 | 11/2012 |
| WO | 2012177023 A1 | 12/2012 |
| WO | 2013047822 A1 | 4/2013 |
| WO | 2013143223 A1 | 10/2013 |

OTHER PUBLICATIONS

Huawei: "Considerations on Support of Dedicated CNs," SA WG2 Meeting #100, S2-134202, Nov. 11-15, 2013, pp. 1-8, San Francisco, USA.

* cited by examiner

NETWORK SELECTION METHOD AND CORE NETWORK DEVICE

This application is a continuation of International Application No. PCT/CN2013/086470, filed Nov. 1, 2013, which is hereby incorporated by reference in its entirety.

TECHNICAL FIELD

The present invention relates to the field of communications technologies, and in particular, to a network selection method and a core network device.

BACKGROUND

Continuous development of telecommunications services has increasingly fueled the demand for network sharing. The network sharing may be a sharing on a radio side, or may be a sharing on a core network side. The network sharing not only provides a cost-effective operating mode to traditional operators who are exploiting new business, but also provides manufacturers in other vertical industries, or some large-size enterprises, groups and VIP (very important person) users with opportunities to meet a special requirement or fulfill a new service by taking advantage of an existing network. However, there are more and more customers demanding to use their own core network devices to operate self-operated services, so as to improve an operating speed and enhance security.

For example, a large scale M2M (machine to machine) manufacturer may express a preference to share a radio infrastructure in an existing cellular network while operating a self-operated service by using a dedicated core network device established by itself; a VIP customer may hope to establish a separate core network to satisfy a demand of the VIP customer for high quality communication, or a mobile virtual network operator (MVNO) may deploy a core network device to operate a self-operated service.

However, a new problem which accompanies the foregoing demands is how to select a specific core network device for access by a terminal user of the foregoing customer who deploys a core network device by itself.

According to a practice in the prior art, a terminal user initiates an attach request to a network, and an RAN (Residential Access Network) side selects an MME (mobility management entity) according to a random number or according to weighting coefficients of MMEs in an MME pool to perform access.

It can be seen that in a method in the prior art, as shown in FIG. 1, a dedicated MME for a user should be an MME2, but according to an existing selection algorithm, an eNodeB (evolved NodeB) may select an MME1. Because the MME1 is not configured as a network element serving the terminal user, the MME1 may reject attach by the user terminal, thereby causing an access failure of the user, and greatly affecting a service process of the user.

SUMMARY

Embodiments provide a network selection method and a core network device, in order to solve a technical problem in the prior art that when a core network device is selected for a user terminal, an access failure of the user terminal is caused due to incorrect selection.

According to a first aspect, a network selection method is provided. The method includes receiving, by a first core network device, an access request message sent by a user equipment UE. The method also includes adding, by the first core network device, information about a dedicated second core network device serving the UE into a temporary identifier of the UE, and sending the temporary identifier to the UE.

With reference to the first aspect, in a first possible implementation, the first core network device is a mobility management entity MME, or the first core network device is a serving general packet radio service support node SGSN, or the first core network device is a mobile switching center MSC/visitor location register VLR.

With reference to the first aspect or the first possible implementation, in a second possible implementation, the UE is a UE configured to be served by a dedicated network, or a UE of a specific type, or a UE with specific subscription data.

With reference to the second possible implementation, in a third possible implementation, the UE of the specific type is a machine type communication MTC UE or a low-priority UE.

With reference to the second possible implementation, in a fourth possible implementation, the specific subscription data refers to subscription data that comprises a specific access point name APN, or subscription data that includes data of a type of a network serving the UE, or subscription data that includes data indicating that the UE needs to be served by a specific network, or subscription data that includes data of a type of a core network element serving the UE.

With reference to the first aspect or any possible implementation of the first possible implementation to the fourth possible implementation, in a fifth possible implementation, the adding, by the first core network device, information about a dedicated second core network device in a dedicated network and serving the UE into a temporary identifier of the UE. Sending the temporary identifier to the UE includes: adding, by the first core network device, the temporary identifier of the UE and a non-broadcast location area identifier into an access accept message, and sending the access accept message to the UE, or, adding, by the first core network device, the temporary identifier of the UE and a value of a periodic location area update timer into the access accept message, and sending the access accept message to the UE.

With reference to the first aspect or any possible implementation of the first possible implementation to the fifth possible implementation, in a sixth possible implementation, after the adding, by the first core network device, information about a dedicated second core network device in a dedicated network and serving the UE into a temporary identifier of the UE, and sending the temporary identifier to the UE, the method further includes: sending, by the first core network device, a detach request to the UE, where the detach request includes a reattach cause value.

With reference to the first aspect or any possible implementation of the first possible implementation to the sixth possible implementation, in a seventh possible implementation, the information about the dedicated second core network device is: a group identifier of the dedicated second core network device, or a code of the dedicated second core network device, or a network resource identifier NRI of the dedicated second core network device.

According to a second aspect, a core network device includes a receiving module, configured to receive an access request message sent by a UE; and an operation module, configured to add information about a dedicated second core network device that resides in a dedicated network and serves the UE into a temporary identifier of the UE, and send the temporary identifier to the UE.

With reference to the second aspect, in a first possible implementation, the core network device is an MME, or the core network device is an SGSN, or the core network device is an MSC/VLR.

With reference to the second aspect or the first possible implementation, in a second possible implementation, the UE is a UE configured to be served by a dedicated network, or a UE of a specific type, or a UE with specific subscription data.

With reference to the second possible implementation, in a third possible implementation, the UE of the specific type is an MTC UE or a low-priority UE.

With reference to the second possible implementation, in a fourth possible implementation, the specific subscription data refers to subscription data that comprises a specific access point name APN, or subscription data that includes data of a type of a network serving the UE, or subscription data that includes data indicating that the UE needs to be served by a specific network, or subscription data that includes data of a type of a core network element serving the UE.

With reference to the first aspect or any possible implementation of the first possible implementation to the fourth possible implementation, in a fifth possible implementation, the operation module is specifically configured to: add the temporary identifier of the UE and a non-broadcast location area identifier into an access accept message, and send the access accept message to the UE; or add the temporary identifier of the UE and a value of a periodic location area update timer into the access accept message, and send the access accept message to the UE.

With reference to the first aspect or any possible implementation of the first possible implementation to the fifth possible implementation, in a sixth possible implementation, the operation module is further configured to send a detach request to the UE, where the detach request includes a reattach cause value.

With reference to the first aspect or any possible implementation of the first possible implementation to the sixth possible implementation, in a seventh possible implementation, the information about the dedicated second core network device is: a group identifier of the dedicated second core network device, or a code of the dedicated second core network device, or an NRI of the dedicated second core network device.

According to a third aspect, a core network device is provided. The core network device includes a memory, configured to store an instruction, and an interface, configured to receive an access request message sent by a UE, and send a temporary identifier of the UE to the UE. The core network device also includes a processor, when performing the instruction, configured to add information about a dedicated second core network device that resides in a dedicated network and serves the UE into the temporary identifier of the UE.

With reference to the third aspect, in a first possible implementation, the core network device is an MME, or the core network device is an SGSN, or the core network device is an MSC/VLR.

With reference to the third aspect or the first possible implementation, in a second possible implementation, the UE is a UE configured to be served by a dedicated network, or a UE of a specific type, or a UE with specific subscription data.

With reference to the second possible implementation, in a third possible implementation, the UE of the specific type is an MTC UE or a low-priority UE.

With reference to the second possible implementation, in a fourth possible implementation, the specific subscription data refers to subscription data that comprises a specific access point name APN, or subscription data that includes data of a type of a network serving the UE, or subscription data that includes data indicating that the UE needs to be served by a specific network, or subscription data that includes data of a type of a core network element serving the UE.

With reference to the first aspect or any possible implementation of the first possible implementation to the fourth possible implementation, in a fifth possible implementation, the processor is specifically configured to: perform the instruction to add the temporary identifier of the UE and a non-broadcast location area identifier into an access accept message, or perform the instruction to add the temporary identifier of the UE and a value of a periodic location area update timer into the access accept message. The interface is specifically configured to send the access accept message to the UE.

With reference to the first aspect or any possible implementation of the first possible implementation to the fifth possible implementation, in a sixth possible implementation, the interface is further configured to send a detach request to the UE, where the detach request includes a reattach cause value.

With reference to the first aspect or any possible implementation of the first possible implementation to the sixth possible implementation, in a seventh possible implementation, the information about the dedicated second core network device is: a group identifier of the dedicated second core network device, or a code of the dedicated second core network device, or an NRI of the dedicated second core network device.

In the embodiments, after receiving an access request message sent by a UE, a first core network device may add information about a dedicated second core network device in a dedicated network into a temporary identifier of the UE, and send the temporary identifier to the UE. In this way, even if the first core network device is not a core network device dedicated to serving the UE, there can be a correct core network device serving the UE when the UE accesses the network the next time.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
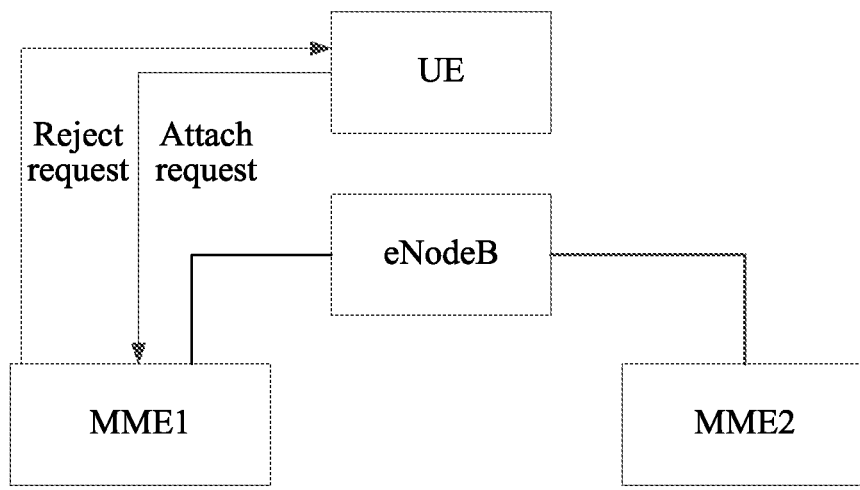
FIG. 1 is a schematic diagram of selecting an MME in the prior art.

Embodiments provide a network selection method. The method may include: receiving, by a first core network device, an access request message sent by a user equipment UE; and adding, by the first core network device, information about a dedicated second core network device that resides in a dedicated network and serves the UE into a temporary identifier of the UE, and sending the temporary identifier to the UE.

In the embodiments, after receiving an access request message sent by a UE, a first core network device may add information about a dedicated second core network device in a dedicated network into a temporary identifier of the UE, and send the temporary identifier to the UE. In this way, even if the first core network device is not a core network device dedicated to serving the UE, there can be a correct core network device serving the UE when the UE accesses the network the next time.

To make the objectives, technical solutions, and advantages of the embodiments clearer, the following clearly describes the technical solutions in the embodiments of the present invention with reference to the accompanying drawings in the embodiments. Apparently, the described embodiments are a part rather than all of the embodiments. All other embodiments obtained by a person of ordinary skill in the art based on the embodiments without creative efforts shall fall within the protection scope of the present invention.

Technologies described in this specification may be applied to various communications systems, for example, current 2G (second generation) and 3G (third generation) communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a General Packet Radio Service (GPRS) system, a Long Term Evolution (LTE) system, and other communications systems.

In this specification, various aspects are described in combination with a user equipment and/or a core network device and/or an access network device.

The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be called a system, a subscriber unit, a subscriber station, a mobile station, a mobile terminal (Mobile), a remote station, an access point, a remote terminal, an access terminal, a user terminal, a user agent, a user device, or a user equipment.

The core network device may be, for example, an MME, and may also be an SGSN.

The dedicated network in all the embodiments of the present invention means that an operator may deploy multiple core networks, and each core network is dedicated to serving a UE of a specific type, for example, an MTC core network is dedicated to serving an MTC UE. This type of core network is referred to as a dedicated core network in the present invention, so as to be distinguished from a network serving human being. The dedicated core network includes an MME and/or an SGSN that serves a UE of a certain type. The dedicated core network may also include another core network device: a gateway device, such as a GGSN (gateway GPRS support node), an SGW (serving gateway), or a PGW (packet data network gateway). There may be one or more MMEs and/or SGSNs, and these MMEs and/or SGSNs may form a pool, or independently cover different areas. The present invention is not limited thereto.

The core network devices in the dedicated network, that is, the MME, the SGSN, the GGSN, the SGW and the PGW, are collectively referred to as a dedicated core network device in the present invention, namely, a core network device dedicated to serving the UE.

It should be particularly noted that in the present invention, the dedicated network or the dedicated core network device can serve the UE, but it is not intended to mean that the dedicated network or the dedicated core network device cannot serve a UE of another type, that is, the dedicated network or the dedicated core network device may also serve a UE of another type, which is not limited in the present invention.

The access network device may be, for example, a base station, or may be an RNC (Radio Network Controller), or may be a BSC (Base Station Controller), or may be an eNodeB (evolved NodeB), or may be a relay, or may be another device on the network side. The base station (for example, an access point) may refer to a device in communication with a wireless terminal via one or more sectors at an air interface in an access network. The base station may be configured to mutually convert a received over-the-air frame and an IP packet and serve as a router between the wireless terminal and a rest portion of the access network, where the rest portion of the access network may include an Internet protocol (IP) network. The base station may also coordinate attribute management of the air interface. For example, the base station may be a base station (BTS, Base Transceiver Station) in GSM or CDMA, may also be a base station (NodeB) in WCDMA, and may further be an evolved base station (evolved NodeB, or e-NodeB) in LTE, which is not limited in the present application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The following further describes the embodiments in detail with reference to accompanying drawings of the specification.

Embodiment 1

Figure 2:
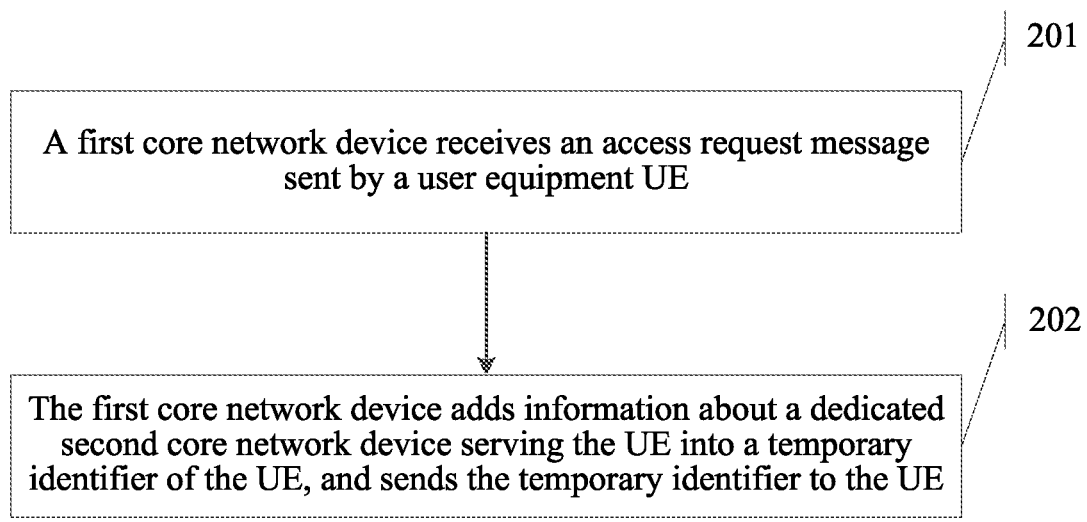
FIG. 2 is a simplified flowchart of a network selection method according to an embodiment.

Referring to FIG. 2, an embodiment provides a network selection method. A main process of the method is as follows.

Step 201: A first core network device receives an access request message sent by a user equipment UE.

In this embodiment, the first core network device is, for example, an MME, and a temporary identifier of the UE is, for example, a GUTI; or the first core network device is, for example, an SGSN, and a temporary identifier of the UE is, for example, a P-TMSI; or the first core network device is an MSC (mobile switching center)/VLR (visitor location register), and a temporary identifier of the UE is a TMSI.

In this embodiment, the first core network device does not belong to a dedicated network serving a UE of a specific type, and therefore, cannot serve a UE of a specific type.

In this embodiment, the UE is a UE configured to be served by a dedicated network, or a UE of a specific type, or a UE with specific subscription data.

Preferably, in this embodiment, the UE of the specific type is an MTC UE or a low-priority UE.

Preferably, in this embodiment, the specific subscription data refers to subscription data that comprises a specific APN, or subscription data that includes data of a type of a network serving the UE, or subscription data that includes data indicating that the UE needs to be served by a specific network, or subscription data that includes data of a type of a core network element serving the UE.

Step 202: The first core network device adds information about a dedicated second core network device serving the UE into a temporary identifier of the UE, and sends the temporary identifier to the UE.

Specifically, in this embodiment, the adding, by the first core network device, information about a dedicated second core network device serving the UE into a temporary identifier of the UE. Sending the temporary identifier to the UE includes: adding, by the first core network device, the temporary identifier of the UE and a non-broadcast location area identifier into an access accept message, and sending the access accept message to the UE; or adding, by the first core network device, the temporary identifier of the UE and a value of a periodic location area update timer into the access accept message, and sending the access accept message to the UE.

Preferably, in all embodiments, a periodic location area update includes but is not limited to a periodic tracking area update, or a periodic routing area update. That is, the value of the periodic location area update timer includes but is not limited to a value of a periodic tracking area update timer, or a value of a periodic routing area update timer.

In all the embodiment, the location area identifier may be a TAI, or an RAI.

Further, in this embodiment, after the adding, by the first core network device, information about a dedicated second core network device that resides in a dedicated network and serves the UE into a temporary identifier of the UE, and sending the temporary identifier to the UE, the method further includes: sending, by the first core network device, a detach request to the UE, where the detach request includes a reattach cause value.

In this embodiment, the information about the dedicated second core network device is: a group identifier (group ID) of the dedicated second core network device, or a code of the dedicated second core network device (MMEC), or an NRI (network resource identifier) of the dedicated second core network device.

In the following, different embodiments are used for description, and the first core network device in these embodiments is different.

Embodiment 2

Figure 3:
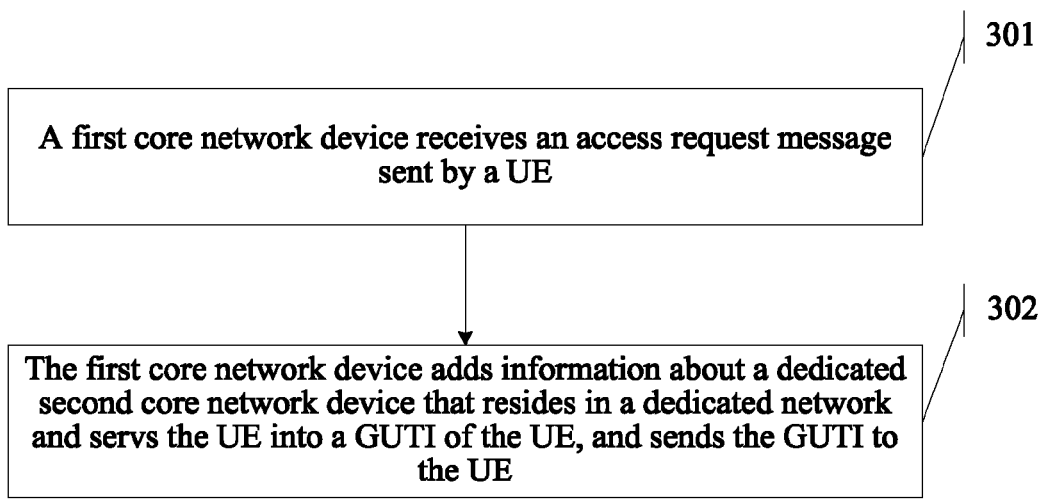
FIG. 3 is a simplified flowchart of a network selection method according to an embodiment, where a first core network device is an MME.

Referring to FIG. 3, an embodiment provides a network selection method. A main process of the method is as follows.

Step 301: A first core network device receives an access request message sent by a UE.

In this embodiment, the first core network device, for example, may be an MME in a core network, which may be referred to as a first MME.

The first MME may receive the access request message sent by the UE. Specifically, the first MME may acquire the access request message through an access network device. That is, the UE may first send the access request message to the access network device, and the access network device sends the access request message to the first MME.

For example, the access network device may be an eNodeB.

Preferably, the access request message in this embodiment may be an attach request, or may be a combined attach request, or may be a TAU request (tracking area update request), or may be a combined TAU request (combined tracking area update request), or the like.

The first core network device does not belong to a dedicated core network serving the UE.

In this embodiment, the UE is a UE configured to be served by a particular dedicated network; or the UE refers to a UE of a specific type, where the specific type may include but is not limited to an MTC (machine type communication) UE, or a low-priority UE; or the UE refers to a UE with specific subscription data, where the specific subscription data refers to subscription data that includes a specific APN. Further, the APN may indicate that the UE needs to be served by a specific network, or subscription data includes a type of a network serving the UE, which includes but is not limited to an MTC network, or subscription data includes data of a type of a core network element serving the UE, which includes but is not limited to an MTC core network element, or subscription data includes data indicating that the UE needs to be served by a specific network.

It should be particularly noted that in the present invention, subscription data of the UE refers to subscription data of an IMSI (international mobile subscriber identity) of the UE in an HSS (Home Subscriber Server), and may be referred to as subscription data of a subscriber that corresponds to the IMSI of the UE, and an acting object of the subscription data of the UE is the subscriber.

Step 302: The first core network device adds information about a dedicated second core network device that resides in a dedicated network and serves the UE into a GUTI of the UE, and sends the GUTI to the UE.

The access request message is equivalent to a trigger condition, and after receiving the access request message of the UE, the first core network device determines that the access request message is from the UE.

Specifically, a method for determining whether a UE is the UE includes: determining whether a UE is a UE of a specific type, for example, whether a UE is a low-priority UE according to subscription of a UE or information that is added by a UE into the access request message; or according to information in subscription data of a UE, for example, information about an APN (access point name) of an MTC in a dedicated network; or according to a parameter included in subscription data to indicate a type of a network serving a UE, or indicating that a UE needs be served by a dedicated network; or according to a local configuration, for example, a list of IMSIs that need be served by a dedicated network, where if an IMSI of a UE is in the list, it is determined that a UE is the UE.

In this embodiment, a temporary identifier of the UE is a GUTI (globally unique temporary identity), the information about the dedicated second core network device may be a group ID, where the group ID, for example, may be an MNC (mobile network code) +MCC+MME Group ID, or is only an MME group ID filled in an MME group ID field of the GUTI. The information about the device may also be an MMEC (MME code), or is a combination of the group ID and an MMEC. It should be noted that although the information about the dedicated second core network device is an MME group ID and/or MMEC, it is not intended to limit the dedicated second core network device to an MME. The dedicated second core network device may also be an SGSN. Specifically, when the UE accesses from LTE, the group ID or the MMEC is used to select a dedicated MME. When the UE accesses from a GERAN (Global System for Mobile Communications/Enhanced Data Rate for GSM Evolution Radio Access Network)/UTRAN (Universal Mobile Telecommunications System Terrestrial Radio Access Network), the MMEC is mapped as an NRI in a P-TMSI (packet temporary mobile subscriber identity), and the NRI in the P-TMSI may also be used to identify a dedicated SGSN.

In embodiments, a dedicated MME is configured with a special group ID or MMEC, and sends the configured group ID or MMEC to an eNodeB that is interconnected to the dedicated MME. When resending the access request message, the UE sends the information about the dedicated second core network device that is included in the GUTI to the eNodeB, and the eNodeB routes the request of the UE to the dedicated MME.

In this embodiment, an access accept message may be an attach accept (attach accept), or may be a combined attach accept, or may be a TAU accept (tracking area update accept), or may be a combined TAU accept (combined tracking area update accept). The access accept message varies depending on different access request messages.

Preferably, in this embodiment, the first core network device may add the GUTI into the access accept message, and send the access accept message to the UE through the access network device, which may specifically be: adding, by the first core network device, the GUTI and a non-broadcast TAI into the access accept message, and sending the access accept message to the UE through the access network device; or adding the GUTI and a value of a periodic location area update timer into the access accept message, and sending the access accept message to the UE, where a timeout limit indicated by the value of the periodic location area update timer should be short enough, for example, the timeout limit indicated by the value of the periodic location area update timer is less than a duration threshold; or sending the GUTI, a non-broadcast TAI, and a value of a periodic location area update timer whose timeout limit is short enough to the UE.

Embodiment 3

Figure 4:
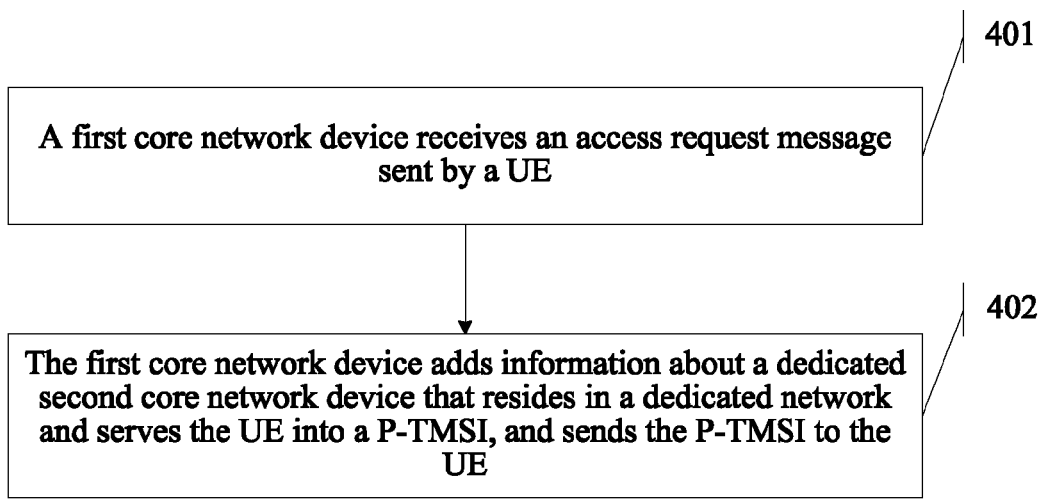
FIG. 4 is a simplified flowchart of a network selection method according to an embodiment, where a first core network device is an SGSN.

Referring to FIG. 4, an embodiment provides a network selection method. A main process of the method is as follows.

Step 401: A first core network device receives an access request message sent by a UE.

In this embodiment, the first core network device, for example, may be an SGSN in a core network, and may be referred to as a first SGSN.

The first SGSN may receive the access request message sent by the UE. Specifically, the first SGSN may acquire the access request message through an access network device. That is, the UE may first send the access request message to the access network device, and the access network device sends the access request message to the first SGSN.

For example, the access network device may be an RNC or a BSC.

Preferably, the access request message in this embodiment of the present invention may be an attach request, or may be a combined attach request, or may be an RAU request (routing area update request), or may be a combined RAU request (combined routing area update request), or the like.

The first core network device does not belong to a dedicated core network serving the UE.

Step 402: The first core network device adds information about a dedicated second core network device that resides in a dedicated network and serves the UE into a P-TMSI, and sends the P-TMSI to the UE.

The access request message is equivalent to a trigger condition, and after receiving the access request message of the UE, the first core network device determines that the access request message is from the UE.

Specifically, a method for determining whether a UE is the UE is shown in Embodiment 2, and details are not described again in this embodiment.

An operator of a dedicated network also configures a specific NRI for a dedicated SGSN, and a correspondence between the NRI and the SGSN is configured in an RNC and/or a BSC that is interconnected to the SGSN.

In this embodiment, a temporary identifier of the UE is a P-TMSI (packet temporary mobile subscriber identity), and the information about the dedicated second core network device is an NRI. It should be noted that although the information about the dedicated second core network device is an NRI, it is not intended to limit the dedicated second core network device to an SGSN, and the dedicated second core network device may also be an MME.

When the UE resends the access request message, it is specifically as follows: When the UE accesses from LTE, the NRI is mapped as an MMEC and is provided to an eNodeB, and the eNodeB routes the request message to a corresponding MME according to the MMEC. When the UE accesses from a GERAN, the NRI is added into a TLLI (temporary logical link identifier), the TLLI is sent to the BSC, and the BSC routes the access request of the UE to a corresponding SGSN according to the NRI. When the UE accesses from a UTRAN, the RNC acquires the NRI from an IDNNS (intra domain non-access stratum node selector) that is provided by the UE, and routes the access request of the UE to a corresponding SGSN.

In Embodiment 2 and Embodiment 3, after determining that a UE is the UE, the first core network device determines the information about the dedicated second core network device serving the UE. The dedicated second core network device belongs to a dedicated network. The dedicated network may only include the dedicated second core network device, or may include multiple core network devices. If there are multiple available core network devices, the first core network device may select a core network device according to a configured algorithm, add information about the selected core network device into the temporary identifier of the UE, and send the temporary identifier to the UE.

In all embodiments, the temporary identifier of the UE is one of the following types depending on a specific situation: a TLLI, a P-TMSI, and a GUTI. Specifically, when the UE accesses from a GERAN, the temporary identifier of the UE may be a P-TMSI, or may be a TLLI; when the UE accesses from a UTRAN, the temporary identifier of the UE is a P-TMSI; and when the UE accesses from LTE, the temporary identifier of the UE is a GUTI.

In this embodiment, if the first core network device does not prestore subscription data of the UE, the first core network device may initiate an authentication procedure, and acquire the subscription data of the UE from an HSS serving the first core network device.

Preferably, in this embodiment, the access accept message may be an attach accept (attach accept), or may be a combined attach accept, or may be an RAU accept, or may be a combined RAU accept, or the like. The access accept message varies depending on different access request messages.

Preferably, in this embodiment, the adding the P-TMSI into the access accept message, and sending the access accept message to the UE may specifically be: adding the P-TMSI and a non-broadcast RAI into the access accept message, and sending the access accept message to the UE; or adding the P-TMSI and a value of a periodic location area update timer into the access accept message, and sending the access accept message to the UE, where a timeout limit indicated by the value of the periodic location area update timer should be short enough, for example, the timeout limit indicated by the value of the periodic location area update timer is less than a duration threshold; or sending the P-TMSI, a non-broadcast RAI, and a value of a periodic location timer whose timeout limit is short enough to the UE. That is, apart from including the GUTI, the access accept message may further include the non-broadcast TAI, and/or the value of the periodic location area update timer.

Further, in Embodiment 2 and Embodiment 3, after the adding the temporary identifier of the UE into the access accept message, and sending the access accept message to the UE, the method may further include: sending a detach request to the UE, where the detach request includes a reattach cause value, so that the UE is reattached to the dedicated second core network device according to the information about the dedicated second core network device.

In Embodiment 2 and Embodiment 3, if the first core network device is not a core network device that serves the UE, while the dedicated second core network device is a core network device that can serve the UE, after sending the temporary identifier of the UE to the UE, the first core network device may further send the detach request to the UE. In this way, after receiving the detach request, the UE can be detached from the first core network device, and reattached to the dedicated second core network device according to the information about the dedicated second core network device, that is, attached to the core network device to which the UE belongs, to complete normal communication operation.

Preferably, after receiving the detach request, the UE may initiate a reattach request through the access network device, where the reattach request may include the information about the dedicated second core network device. After receiving the information about the dedicated second core network device, the access network device may select the dedicated second core network device according to the information about the dedicated second core network device, and send the reattach request to the dedicated second core network device.

After receiving the reattach request, the dedicated second core network device may parse the temporary identifier of the UE included in the reattach request, and locate a specific UE according to the temporary identifier of the UE. If the locating succeeds, the dedicated second core network device may send an attach accept message to the UE through the access network device, so that the UE is successfully attached to the dedicated second core network device.

Assume that the following two cases occur when the dedicated second core network device parses the temporary identifier of the UE:

1: the temporary identifier of the UE collides with the temporary identifier that was parsed by the dedicated second core network device before; and 2: the dedicated second core network device cannot find a context of the UE according to the temporary identifier of the UE.

If the foregoing two cases occur, the dedicated second core network device may determine that re-authentication needs to be performed.

The dedicated second core network device may initiate an identity request to the UE, and after receiving the identity request, the UE may return response information to the identity request to the dedicated second core network device, where the response information to the identity request may include an IMSI of the UE.

After obtaining the response information, the dedicated second core network device may initiate a location update procedure to the HSS, and the HSS may return a location update response to the dedicated second core network device, so that the dedicated second core network device may return the attach accept message to the UE, and the UE successfully accesses the dedicated second core network device.

Preferably, in this embodiment, if the UE initiates an access request procedure, but the access network device detects that the dedicated second core network device corresponding to the information about the dedicated second core network device which is sent by the UE is performing subscriber migration, that is, the information about the dedicated second core network device in the access network device indicates that a current state of the dedicated second core network device is inaccessible, the access network device needs to instruct the UE to select another core network device in the dedicated network to access. For example, the access network device may send information about all available core network devices in the dedicated network to the UE, so that the UE makes selection from these available core network devices. After the selection, the UE may re-initiate, according to the information about the selected core network device, the access request procedure through the access network device.

Figure 5:
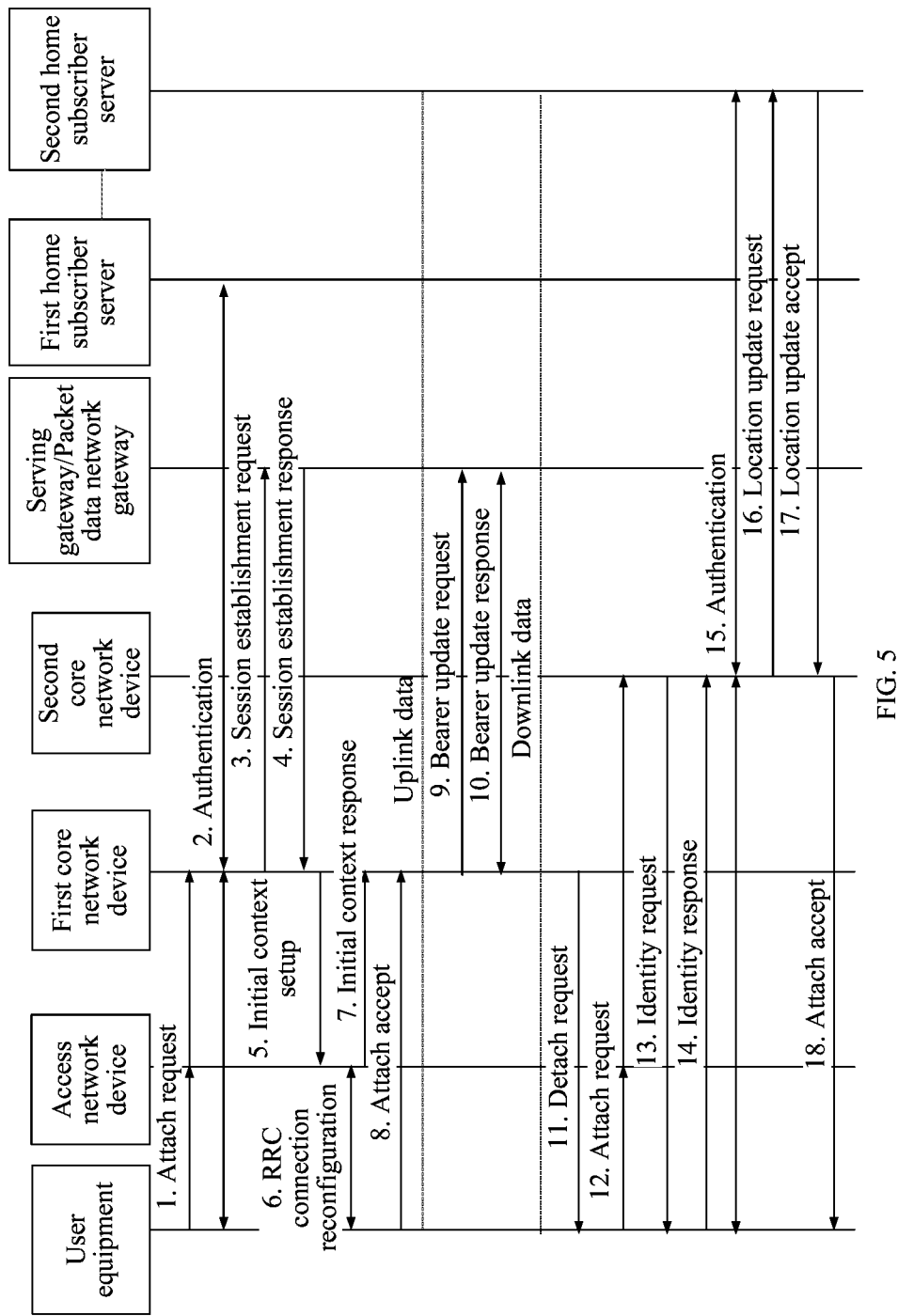
FIG. 5 is a schematic interaction diagram of a network selection method according to an embodiment.

For example, referring to FIG. 5, a specific example is used to describe the network selection method in this embodiment. In the example of FIG. 5, the first core network device is an MME, and the access network device is an eNodeB. In FIG. 5, a first home subscriber server corresponds to the first core network device, and a second home location subscriber subscription server corresponds to the dedicated second core network device.

First, the UE sends the access request message to the first core network device through the access network device. In FIG. 5, the access request message is, for example, an attach request message, and the attach request message may include an IMSI of the UE. If the attach request message does not include the IMSI of the UE, but includes a GUTI of the UE, the first core network device may acquire the IMSI of the UE by searching, by using the GUTI, for an old SGSN (source SGSN) or an MME that serves the UE.

For example, if no subscription data of the UE is stored on the first core network device side, the first core network device initiates an authentication procedure, that is, the first core network device requests to obtain the subscription data of the UE from the first home subscriber server.

The dedicated network of the UE may include a dedicated SGW, PGW or GGSN. For example, in the present invention, if an SGW and a PGW are included, the first core network device may select a corresponding SGW and PGW for the UE according to the dedicated network to which the UE belongs, and initiate a session establishment request to the selected SGW and PGW.

After receiving the session establishment request, the SGW and the PGW may send a corresponding response message to the first core network device.

The first core network device may send an access accept message to the access network device, and in the example of FIG. 5, the access accept message is an attach accept message. The first core network device may set up an initial user context for the UE. The attach accept message includes a temporary identifier of the UE, where the temporary identifier of the UE includes information about the dedicated second core network device. In the example provided in this embodiment of the present invention, the temporary identifier of the UE is a GUTI, and the GUTI includes the information about the dedicated second core network device, which for example, may be a group ID or an MMEC.

Optionally, the attach accept message may further include a non-broadcast TAI, and/or a value of a periodic location area update timer which is short enough. The UE stores the non-broadcast TAI and/or the value of the periodic location area update timer. At a point of time after the attach accept message is received, the UE reads that a broadcast TAI is different from a locally stored TAI, or a value of a periodic location area update timer times out. The UE initiates a tracking area update request or a periodic tracking area update request, and sends the tracking area update request or the periodic tracking area update request to the MME through the eNodeB. In addition, the UE sends the information about the dedicated second core network device to the eNodeB, and the eNodeB sends the (periodic) tracking area update request to a corresponding MME.

Specifically, if the information about the dedicated second core network device is a group ID, and a value of a group ID of an MME that is interconnected to the eNodeB is the same as that provided by the UE, the eNodeB routes the request message to the MME. If there are multiple MMEs having a group ID that is the same as the group ID provided by the UE, the eNodeB may select an MME according to an algorithm, for example, according to load balancing, and route the message to the MME.

Alternatively, if the information about the dedicated second core network device is an MMEC, the eNodeB routes the message to an MME that has a same MMEC as the dedicated second core network device does.

The access network device may send an RRC (Radio Resource Control) connection reconfiguration message to the UE, where the RRC connection reconfiguration message may include EPS Radio Bearer ID (evolved packet system radio bearer identifier) information and an attach accept message. When receiving the attach accept message, the UE may set a TIN (the temporary identifier of the UE) as the GUTI, and return an RRC reconfiguration completion message to the access network device.

The access network device may initiate an initial context setup response message to the first core network device, and the UE sends an attach accept completion message to the first core network device through the access network device.

To update information about the access network device on the SGW side and the PGW side, the first core network device may initiate a bearer update request to the SGW and the PGW, and the SGW and the PGW may return a bearer update response to the first core network device.

Optionally, the first core network device further needs to initiate a detach request to the UE through the access network device, where the detach request includes a reattach cause value.

The UE sends a reattach request to the dedicated second core network device through the access network device, and the UE provides the information about the dedicated second core network device to an access network element, so that the access network device can route the reattach request to the dedicated second core network device according to the information about the dedicated second core network device. In the example provided in this embodiment of the present invention, the temporary identifier of the UE is a GUTI, the information about the dedicated second core network device is an MMEC, and the access network element is an eNodeB. When the UE provides the MMEC to the eNodeB, the eNodeB routes the attach request to a corresponding MME according to the MMEC.

After receiving the reattach request, the dedicated second core network device parses the GUTI that is included therein, and locates the UE according to the GUTI. In FIG. 5, assume that one of the following two cases occurs:

1: the GUTI collides with a GUTI that was parsed by the dedicated second core network device before; and 2: the dedicated second core network device cannot find a context of the UE according to the GUTI.

The dedicated second core network device determines that an integrity protection check of the reattach request is not passed, and re-authentication needs to be performed.

The dedicated second core network device initiates an identity request to the UE, and the UE returns the response information to the identity request to the dedicated second core network device, where the response information to the identity request includes the IMSI of the UE.

The dedicated second core network device initiates a location update procedure to the second home location subscriber subscription server, the second home location subscriber subscription server returns a location update response to the dedicated second core network device, and the dedicated second core network device returns an attach accept response to the UE, so that the UE is successfully attached to the dedicated second core network device.

It should be particularly noted that the network selection method in this embodiment of the present invention is also applicable between an MSC/VLR and a UE. That is, the first core network device may also be an MSC/VLR.

In this case, what the MSC/VLR accepts is a location area update (LAU Location area Update) request message, and the temporary identifier of the UE sent by the MSC/VLR to the UE is a TMSI, where the TMSI may include an NRI of the dedicated second core network device, and the MSC/VLR may add the TMSI into a location area update accept message and send the location area update accept message to the UE.

Preferably, the update accept message may further include a non-broadcast LAI (location area identifier). That is, the adding, by the MSC/VLR, information about a dedicated second core network device that serves the UE into the update accept message, and sending the update accept message to the UE may specifically be: adding, by the MSC/VLR, the TMSI and the non-broadcast LAI into the update accept message, and sending the update accept message to the UE.

Embodiment 4

Figure 6:
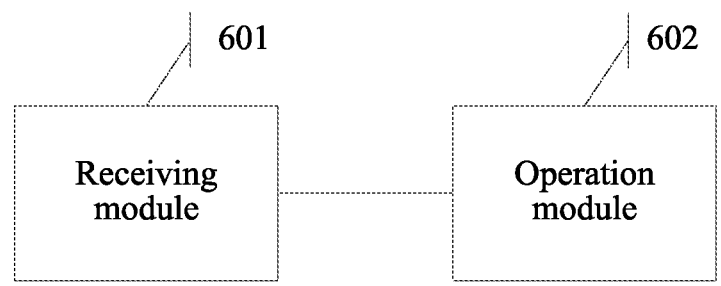
FIG. 6 is a structural diagram of a first core network device according to an embodiment.

Referring to FIG. 6, an embodiment provides a core network device. The core network device may include a receiving module 601 and an operation module 602. Preferably, the core network device and the first core network device in Embodiment 1 to Embodiment 3 may be a same core network device.

The receiving module 601 may be configured to receive an access request message sent by a UE.

The operation module 602 may be configured to add information about a dedicated second core network device that resides in a dedicated network and serves the UE into a temporary identifier of the UE, and send the temporary identifier to the UE.

Optionally, the core network device is an MME, and the temporary identifier of the UE is, for example, a GUTI; or the core network device is an SGSN, and the temporary identifier of the UE is, for example, a P-TMSI; or the core network device is an MSC/VLR, and the temporary identifier of the UE is, for example, a TMSI.

Optionally, the UE is a UE configured to be served by a dedicated network, or a UE of a specific type, or a UE with specific subscription data.

Optionally, the UE of a specific type is an MTC UE or a low-priority UE.

Optionally, the specific subscription data refers to subscription data that comprises a specific access point name APN, or subscription data that includes data of a type of a network serving the UE, or subscription data that includes data indicating that the UE needs to be served by a specific network, or subscription data that includes data of a type of a core network element serving the UE.

Optionally, the operation module 602 may specifically be configured to: add the temporary identifier of the UE and a non-broadcast location area identifier into an access accept message, and send the access accept message to the UE; or add the temporary identifier of the UE and a value of a periodic location area update timer into the access accept message, and send the access accept message to the UE.

Optionally, the operation module 602 may further be configured to send a detach request to the UE, where the detach request includes a reattach cause value.

Optionally, the information about the dedicated second core network device is: a group identifier of the dedicated second core network device, or a code of the dedicated second core network device, or an NRI of the dedicated second core network device.

Embodiment 5

An embodiment provides a core network device 700. The device 700 and the core network device in Embodiment 4 and the first core network device in Embodiment 1 to Embodiment 3 may be a same device.

Figure 7:
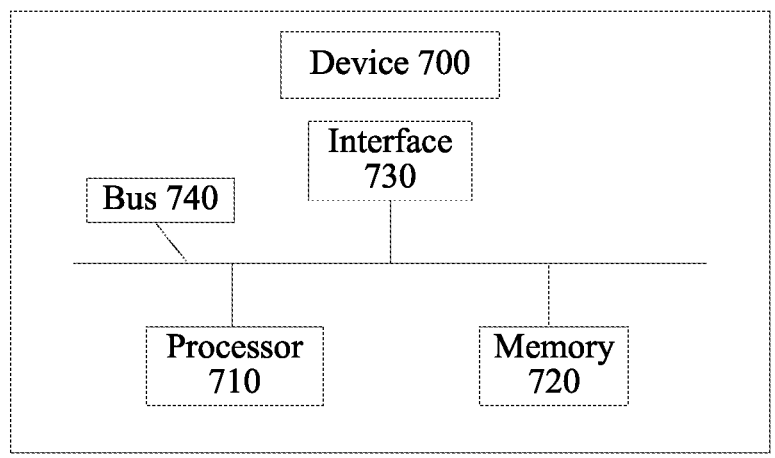
FIG. 7 is a schematic diagram of a first core network device according to an embodiment.

As shown in FIG. 7, the device 700 includes: a bus 740; and a processor 710, a memory 720, and an interface 730 that are connected to the bus 740, where the interface 730 is configured to receive an access request message sent by a UE, and send a temporary identifier of the UE to the UE; the memory 720 is configured to store an instruction; and the processor 710 is configured to perform the instruction to add information about a dedicated second core network device that resides in a dedicated network and serves the UE into the temporary identifier of the UE.

In this embodiment, optionally, the core network device is an MME, and the temporary identifier of the UE is, for example, a GUTI; or the core network device is an SGSN, and the temporary identifier of the UE is, for example, a P-TMSI; or the core network device is an MSC/VLR, and the temporary identifier of the UE is, for example, a TMSI.

In this embodiment, optionally, the UE is a UE configured to be served by a dedicated network, or a UE of a specific type, or a UE with specific subscription data.

In this embodiment, optionally, the UE of a specific type is an MTC UE or a low-priority UE.

In this embodiment, optionally, the specific subscription data refers to subscription data that comprises a specific access point name APN, or subscription data that includes data of a type of a network serving the UE, or subscription data that includes data indicating that the UE needs to be served by a specific network, or subscription data that includes data of a type of a core network element serving the UE.

In this embodiment, optionally, the processor 710 is specifically configured to: perform the instruction to add the temporary identifier of the UE and a non-broadcast location area identifier into an access accept message, or perform the instruction to add the temporary identifier of the UE and a value of a periodic location area update timer into the access accept message.

In this embodiment, optionally, the interface 730 is specifically configured to send the access accept message to the UE.

In this embodiment, optionally, the interface 730 is further configured to send a detach request to the UE, where the detach request includes a reattach cause value.

In this embodiment, optionally, the information about the dedicated second core network device is: a group identifier of the dedicated second core network device, or a code of the dedicated second core network device, or an NRI of the dedicated second core network device.

The embodiments provide a network selection method. The method may include: receiving, by a first core network device, an access request message sent by a UE; and adding, by the first core network device, information about a dedicated second core network device that resides in a dedicated network and serves the UE into a temporary identifier of the UE, and sending the temporary identifier to the UE.

In the embodiments, after receiving the access request message sent by the UE, the first core network device may add the information about the dedicated second core network device in the dedicated network into the temporary identifier of the UE, and send the temporary identifier to the UE. In this way, even if the first core network device is not a core network device dedicated to serving the UE, there can be a correct core network device serving the UE when the UE accesses the network the next time.

It may be clearly understood by a person skilled in the art that, for the purpose of convenient and brief description, division of the foregoing functional modules is merely used as an example, and in an actual implementation, the foregoing functions may be assigned to different functional modules according to an actual need, that is, an internal structure of the apparatus is divided into different functional modules, to complete all or a part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in an actual implementation. For example, a plurality of units or components may be combined or integrated into another system, or some features may be ignored or not performed. Furthermore, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes any medium that can store program code, such as a USB flash drive, a removable hard disk, a read-only memory (ROM), a random access memory (RAM), a magnetic disk, or an optical disc.

The foregoing is merely intended to describe the technical solutions of the present application in detail. The descriptions of the foregoing embodiments are merely intended to help understand the method and idea of the present invention, and shall not be construed as a limitation on the present invention. Any variation or replacement readily figured out by a person skilled in the art within the technical scope disclosed in the present invention shall fall within the protection scope of the present invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A network selection method comprising:
  receiving, by a first core network device, an access request message from a user equipment (UE), wherein the first core network device does not belong to a dedicated core network serving the UE; and
  sending, by the first core network device, an access accept message to the UE, wherein the access accept message comprises a temporary identifier and a value of a periodic location area update timer, wherein the temporary identifier of the UE comprises information about a second core network device, wherein the second core network device belongs to the dedicated core network serving the UE.

2. The method according to claim 1, wherein the first core network device is a mobility management entity (MME).

3. The method according to claim 1, wherein the first core network device is a serving general packet radio service support node (SGSN).

4. The method according to claim 1, wherein the first core network device is a mobile switching center (MSC)/visitor location register (VLR).

5. The method according to claim 1, wherein the UE is configured to be served by a dedicated network, or a UE of a specific type, or a UE with specific subscription data.

6. The method according to claim 5, wherein the UE of the specific type is a machine type communication (MTC) UE or a low-priority UE.

7. The method according to claim 5, wherein the specific subscription data refers to subscription data that comprises a specific access point name (APN), or subscription data that comprises data of a type of a network serving the UE, or subscription data that comprises data indicating that the UE needs to be served by a specific network, or subscription data that comprises data of a type of a core network element serving the UE.

8. The method according to claim 1, further comprising: sending, by the first core network device, a detach request to the UE, wherein the detach request comprises a reattach cause value.

9. The method according to claim 1, wherein the information about the dedicated second core network device is: a group identifier of the dedicated second core network device, or a code of the dedicated second core network device, or a network resource identifier (NRI) of the dedicated second core network device.

10. A core network device comprising:
  a memory configured to store an instruction;
  an interface configured to receive an access request message from a user equipment (UE), wherein the core network device does not belong to a dedicated core network serving the UE; and
  a processor, when performing the instruction, configured to cause the interface to send an access accept message to the UE, wherein the access accept message comprises a temporary identifier and a value of a periodic location area update timer, wherein the temporary identifier of the UE comprises information about a second core network device, and wherein the second core network device belongs to the dedicated core network serving the UE.

11. The device according to claim 10, wherein the core network device is a mobility management entity (MME).

12. The device according to claim 10, wherein the core network device is a serving general packet radio service support node (SGSN).

13. The device according to claim 10, wherein the core network device is a mobile switching center (MSC)/visitor location register (VLR).

14. The device according to claim 10, wherein the UE is a UE configured to be served by a dedicated network, or a UE of a specific type, or a UE with specific subscription data.

15. The device according to claim 14, wherein the UE of the specific type is an MTC UE or a low-priority UE.

16. The device according to claim 14, wherein the specific subscription data refers to subscription data that comprises a specific access point name (APN), or subscription data that comprises data of a type of a network serving the UE, or subscription data that comprises data indicating that the UE needs to be served by a specific network, or subscription data that comprises data of a type of a core network element serving the UE.

17. The device according to a claim 10, wherein the interface is further configured to send a detach request to the UE, wherein the detach request comprises a reattach cause value.

18. The device according to claim 10, wherein the information about the second core network device is: a group identifier of the second core network device, or a code of the second core network device, or a network resource identifier (NRI) of the second core network device.

\* \* \* \* \*